L. LOHNES.
HEADLIGHT.
APPLICATION FILED FEB. 3, 1919.
1,309,644.
Patented July 15, 1919.
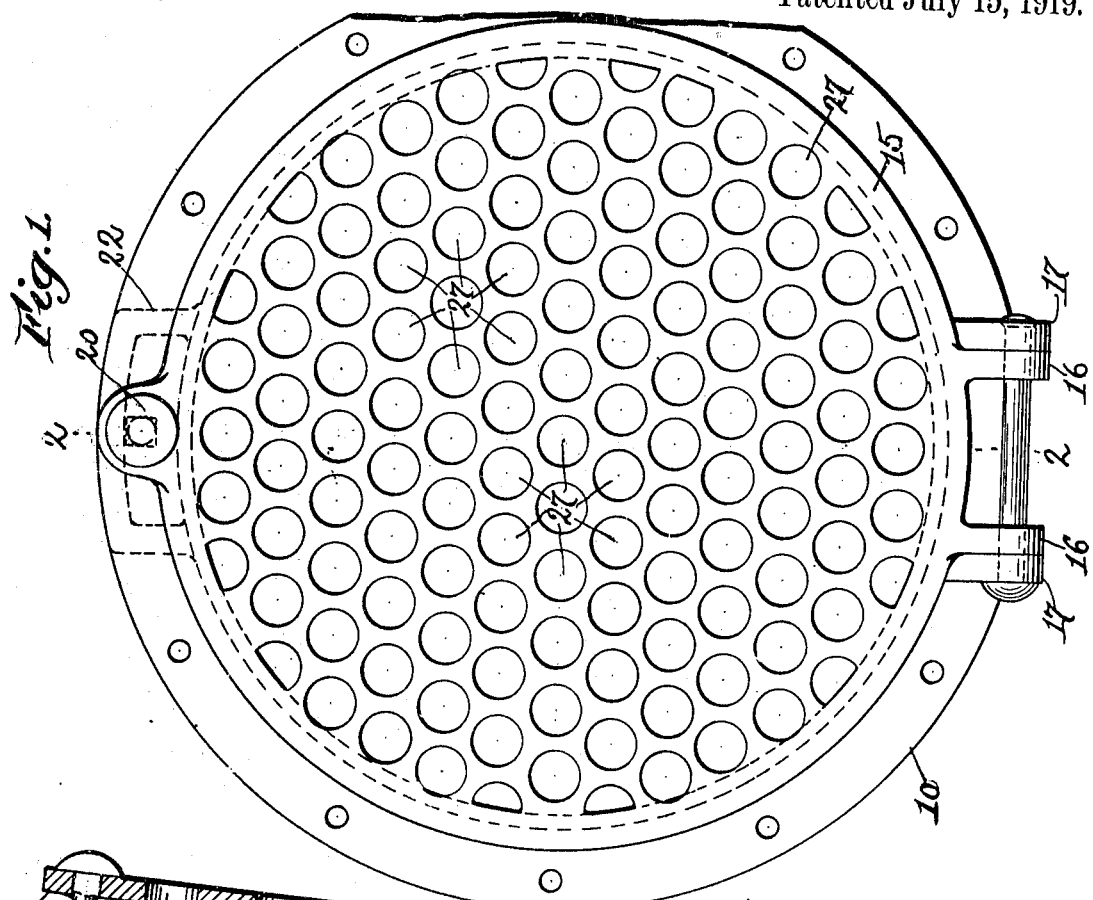
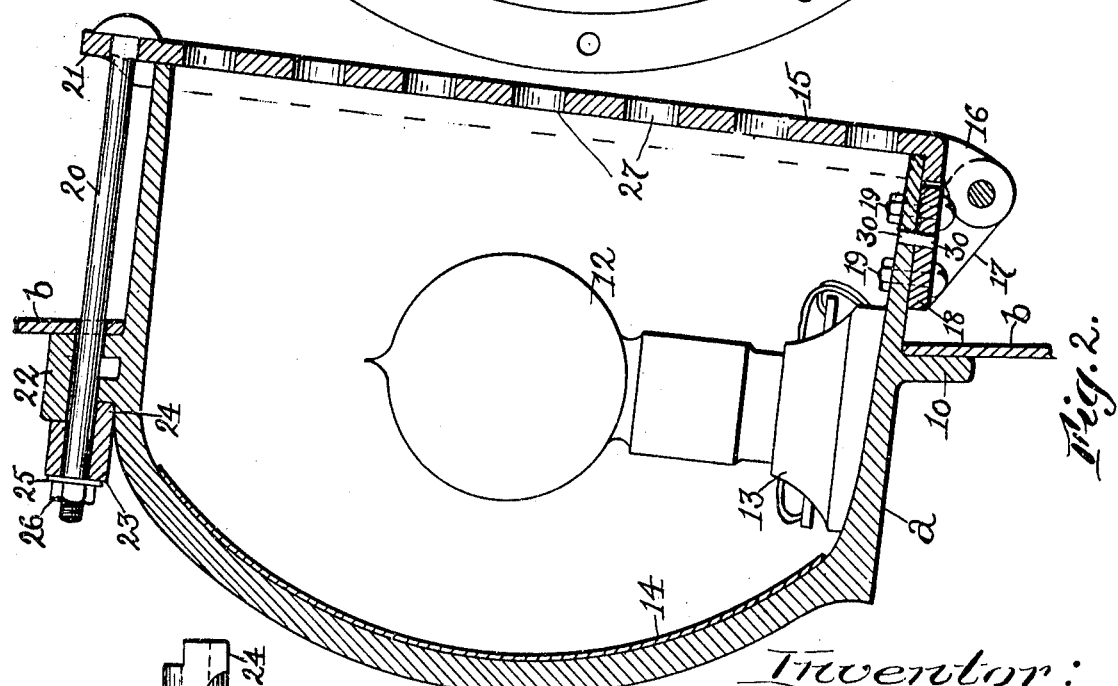
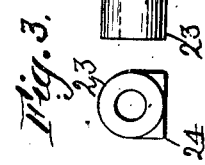
Inventor:
Livingston Lohnes
by Jas. H. Churchill
atty.

UNITED STATES PATENT OFFICE.

LIVINGSTON LOHNES, OF BOSTON, MASSACHUSETTS.

HEADLIGHT.

1,309,644.

Specification of Letters Patent. Patented July 15, 1919.

Application filed February 3, 1919. Serial No. 274,644.

*To all whom it may concern:*

Be it known that I, LIVINGSTON LOHNES, a citizen of the United States, residing in Boston, county of Suffolk, and State of Massachusetts, have invented an Improvement in Headlights, of which the following description, in connection with the accompanying drawings, is a specification, like characters on the drawings representing like parts.

This invention relates to headlights and is herein shown as embodied in a headlight used on the cars of electric railways and carried by the dasher of said cars.

As now commonly constructed, headlights of the character described are provided with a casing having its rear end located at the rear of the dasher and its front end in front of the dasher which is permitted by a hole in the dasher, and said casing contains a lamp socket, a lamp detachably secured in said socket, and is closed at its open front end by a glass usually circular in shape, and secured to the casing by a bezel ring.

Each electric car is provided with a headlight at its front and rear end, and experience has demonstrated that it is substantially impossible to keep the headlights in operative condition, owing to the fact that the lamps, fixtures, and bezel rings are removable from the headlight at the rear end of the car, and the glass is destroyed to gain access to the parts removable from the casing by unauthorized persons.

The present invention has for its object to provide a headlight for use on street railway cars, which is practically proof against the unauthorized removal of its parts.

To this end, the glass and bezel ring of the old style headlight are dispensed with, and the casing is provided with a non-breakable closure member preferably of metal, which is provided with openings for the transmission of light through it, and which is locked to the casing.

The locking mechanism for the closure member may and preferably will be made as will be described, so as to render the locking mechanism inaccessible from outside of the car.

These and other features of this invention will be pointed out in the claims at the end of this specification.

Figure 1 is a front elevation of a headlight embodying this invention.

Fig. 2, a section on the line 2—2, Fig. 1, and

Fig. 3, details to be referred to.

Referring to the drawing, *a* represents one form of headlight casing, commonly used with electric railways cars. The casing *a* is made of metal and as shown is inserted through a hole in the dasher *b* of the car, and is provided with an annular flange 10 which engages the rear surface of the dasher and is bolted, riveted or otherwise secured thereto.

The casing *a* is closed at its rear end and is open at its front end and contains an electric lamp 12 detachably secured to a socket piece 13, and a reflector 14.

The front end of the casing is normally closed by a non-breakable member in the form of a metal cover 15, which is preferably hinged to the casing so as to be capable of being turned to uncover the casing and permit access to the interior thereof by authorized persons.

In the present instance, the cover 15 is provided with lugs or ears 16 which coöperate with like lugs 17 on a plate 18 secured to the casing by bolts 19 or otherwise.

The cover 15 is made of greater diameter than the open end of the casing and is designed to be locked to said casing, which may be effected in a simple and inexpensive manner by means of a substantially long bolt 20, which is passed through a lug or projection 21 on the cover and through a suitable hole in the dasher *b* and through a hole in a boss 22 on the casing at the rear of the dasher. The inner end of the bolt 20 has mounted on it a sleeve 23 which is provided at its front end with a projection 24 adapted to enter an opening in the rear end of the boss 22 and said projection is provided with a straight or flat upper surface to engage the under surface of the upper part of the boss so as to prevent the sleeve being turned. The bolt 20 projects through the sleeve 23 and is provided with a washer 25 and nut 26, which it will be noticed are located on the rear side of the dasher and within the car.

The cover 15 is preferably made as a casting of malleable iron and is provided with a plurality of holes or openings 27 through it for the transmission of the light from the lamp through the cover and onto the track.

The cover 15 is cast with the openings 27 in it and is therefore substantially inexpensive, and being of malleable iron is practically non-breakable, and, as a result, the lamp 12 and socket 13 are inaccessible to boys from outside of the car, thereby not only insuring a great saving to the railway company but also insuring proper lighting of the tracks and avoiding danger of accidents from unlighted headlights.

The casing $a$ and the plate 18 are provided with bleeder holes 30, which extend from the inner surface of the casing to the outside of the plate, and afford an avenue for the escape of any moisture which may pass into the casing through the openings 27 in the cover.

In the winter time any snow which is deposited on the cover is melted by the heat from the lamp as has been demonstrated by actual practice.

In the present instance I have shown one construction of headlight embodying the invention, but it is not desired to limit the invention to the particular construction shown.

Claims.

1. In a light of the character described, in combination, a casing provided with an open end, a substantially non-breakable cover for said open end having openings for the passage through it of rays of light from within the casing, and means for locking said cover to said casing in permanent relation thereto against unauthorized removal.

2. In a light of the character described, in combination, a casing provided with an open end and with a bleeder opening through its wall, a metal closure member for said open end pivoted to said casing and provided with openings for the transmission of light through it from within the casing, and means for locking said closure member to said casing.

3. The combination with the dasher of a railway car having an opening through it, of a headlight casing secured to said dasher in line with said opening, a metallic closure member for the end of the casing in front of said dasher having a plurality of openings for the transmission of light through it, and means for locking said closure member to said casing, said means being extended to the rear side of said dasher.

In testimony whereof I have signed my name to this specification.

LIVINGSTON LOHNES.